(12) United States Patent
Takano et al.

(10) Patent No.: US 10,082,676 B2
(45) Date of Patent: Sep. 25, 2018

(54) SHAKE CORRECTION DEVICE AND OBSERVATION DEVICE

(71) Applicant: FUJIFILM Corporation, Tokyo (JP)

(72) Inventors: Shigeyuki Takano, Saitama (JP); Masaki Arai, Saitama (JP); Naoki Yamaguchi, Saitama (JP); Hiromitsu Kaburagi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 480 days.

(21) Appl. No.: 14/948,994

(22) Filed: Nov. 23, 2015

(65) Prior Publication Data
US 2016/0077354 A1    Mar. 17, 2016

Related U.S. Application Data

(63) Continuation of application No. PCT/JP2014/063306, filed on May 20, 2014.

(30) Foreign Application Priority Data

Jun. 6, 2013 (JP) ................................ 2013-119650

(51) Int. Cl.
*G02B 27/64* (2006.01)
*G02B 23/02* (2006.01)
(Continued)

(52) U.S. Cl.
CPC ............. *G02B 27/646* (2013.01); *G02B 5/04* (2013.01); *G02B 23/00* (2013.01); *G02B 23/02* (2013.01);
(Continued)

(58) Field of Classification Search
None
See application file for complete search history.

(56) References Cited

U.S. PATENT DOCUMENTS 5,910,859 A * 6/1999 Takahashi ............ G02B 27/646
                                                        359/554
2007/0196085 A1* 8/2007 Enomoto ................. G03B 5/02
                                                        396/55
(Continued)

FOREIGN PATENT DOCUMENTS

JP          3417447 B2     6/2003

OTHER PUBLICATIONS

International Search Report issued in PCT/JP2014/063306 dated Aug. 26, 2014.
(Continued)

*Primary Examiner* — Derek S Chapel
(74) *Attorney, Agent, or Firm* — Birch, Stewart, Kolasch & Birch, LLP

(57) ABSTRACT

A first correction signal creation unit splits an angular velocity signal of an ultra low-low frequency band from an angular velocity signal of an X-axis angular velocity sensor and outputs a first correction signal amplified based on signal output characteristics of the angular velocity sensor. A second correction signal creation unit splits an angular velocity signal of a low-high frequency band from the angular velocity signal and outputs a second correction signal amplified based on the signal output characteristics of the angular velocity sensor. An addition computation unit creates a composite correction signal in which the first correction signal and the second correction signal are composed, and a drive computation unit creates a drive signal based on the composite correction signal. A driver drives the X-axis actuator based on the drive signal, displaces the correction optical element, and corrects shake of an image.

20 Claims, 17 Drawing Sheets

(51) Int. Cl.
*H04N 5/232* (2006.01)
*G02B 23/00* (2006.01)
*G02B 5/04* (2006.01)
*G02B 23/18* (2006.01)

(52) U.S. Cl.
CPC ............ *G02B 23/18* (2013.01); *H04N 5/232* (2013.01); *H04N 5/23258* (2013.01); *H04N 5/23287* (2013.01)

(56) References Cited

U.S. PATENT DOCUMENTS

| | | | | |
|---|---|---|---|---|
| 2007/0201848 | A1* | 8/2007 | Taguchi | G03B 5/02 396/55 |
| 2008/0292297 | A1* | 11/2008 | Fushida | H04N 5/23248 396/55 |
| 2010/0302385 | A1* | 12/2010 | Kurihara | H04N 5/23248 348/208.4 |

OTHER PUBLICATIONS

Written Opinion of the International Searching Authority issued in PCT/JP2014/063306 dated Aug. 26, 2014.

International Preliminary Report On Patentability and English translation of the Written Opinion of the International Searching Authority, dated Dec. 8, 2015, for International Application No. PCT/JP2014/063306.

* cited by examiner

FIG. 11

| MODE | FIRST COEFFICIENT | SECOND COEFFICIENT |
|---|---|---|
| MODE A: LAND HANDHELD MODE | 0.2 | 0.8 |
| MODE B: ON-BOARD HANDHELD MODE | 0.5 | 0.5 |
| MODE C: ON-BOARD FIXED MODE | 0.8 | 0.2 |

| MODE | FIRST COEFFICIENT | SECOND COEFFICIENT | THIRD COEFFICIENT |
|---|---|---|---|
| MODE A: LAND HANDHELD MODE | 0.2 | 0.7 | 0.1 |
| MODE B: ON-BOARD HANDHELD MODE | 0.5 | 0.5 | 0 |
| MODE C: ON-BOARD FIXED MODE | 0.7 | 0.2 | 0.1 |

119

OUTPUT CHARACTERISTIC OF
ANGULAR VELOCITY SENSOR

SHAKE CORRECTION DEVICE AND OBSERVATION DEVICE

CROSS-REFERENCE TO RELATED APPLICATIONS

This application is a Continuation of PCT International Application No, PCT/JP2014/063306 filed on May 20, 2014, which claims priority under 35 U.S.C § 119(a) to Japanese Patent Application No. 2013-119650 filed on Jun. 6, 2013. Each of the above application(s) is hereby expressly incorporated by reference, in its entirety, into the present application.

BACKGROUND OF THE INVENTION

1. Field of the Invention

The present invention relates to a shake correction device which corrects shake of an optical image, and an observation device including the shake correction device.

2. Description of the Related Art

As an observation device which is used to enlarge and observe an image of a distant object to be observed, a monocle, binoculars, and the like are known. In the observation with the observation device, the observation device oscillates due to hand shake or the like, and an image is shaken and not easily observed. For this reason, various observation devices having a function of correcting shake of an image have been invented (for example, see JP 3417447B).

An observation device described in JP 3417447B includes an objective lens and an ocular lens which are fixed to a housing, and a shake correction device which corrects shake of an image formed by the objective lens and the ocular lens. The shake correction device includes a correction optical element which is displaceably disposed between the objective lens and the ocular lens, an actuator which displaces the correction optical element, and a displacement sensor which detects oscillation applied to the housing. A control unit of the shake correction device drives the actuator based on a displacement signal output from the displacement sensor, displaces the correction optical element, and corrects shake of an image formed by the objective lens and the ocular lens. For the displacement sensor, for example, an angular velocity sensor is used in order to measure the rotation position of the correction optical element with respect to the housing.

SUMMARY OF THE INVENTION

Not only one type of oscillation, such as hand shake, but also a plurality of types of oscillation may be simultaneously applied to the observation device. For example, when a user holds the observation device on a vehicle, such as a ship, to observe an object to be observed, high-frequency oscillation due to hand shake and low-frequency oscillation due to the rolling of the ship are simultaneously applied to the observation device. However, in a shake correction device of the related art which uses an angular velocity sensor as a displacement sensor, when a plurality of types of oscillation having different frequency bands are simultaneously applied, it is not possible to appropriately correct shake of an image due to oscillation in a low frequency band.

When a plurality of types of oscillations having different frequency bands are measured, the angular velocity sensor outputs an angular velocity signal in which the measurement results of a plurality of types of oscillation are mixed. As shown in FIG. 16, the angular velocity sensor has output characteristics that an output value of the angular velocity signal changes in proportion to the frequency of the measured oscillation. For this reason, for example, when high-frequency oscillation of 10 Hz due to hand shake and low-frequency oscillation of 1 Hz due to the rolling of the ship are measured by the angular velocity sensor, as shown in FIG. 17, the angular velocity signal has high-frequency oscillation of 10 Hz and low-frequency oscillation of 1 Hz mixed therein, and an output value determined from the amplitude of oscillation of 1 Hz becomes one tenth of the amplitude of oscillation of 10 Hz. When the actuator of the shake correction device is driven based on the angular velocity signal, the amount of displacement of the correction optical element corresponding to oscillation of 1 Hz is slight; therefore, it is not possible to appropriately correct shake of an image based on the rolling of the ship. Since shake of the image due to the rolling of the ship is small, there is no problem in observing an object to be observed for a short time; however, at the time of observation for a long time, a sense of discomfort, such as motion sickness, may occur due to shake of the image.

An object of the invention is to provide a shake correction device and an observation device capable of appropriately correcting shake of an image when a plurality of types of oscillation having different frequency bands are simultaneously applied.

A shake correction device of the invention includes a correction optical element which is displaceably provided between an objective lens and an ocular lens fixed to a housing, an actuator which displaces the correction optical element, a displacement sensor which detects oscillation applied to the housing and outputs a displacement signal, a correction signal output unit which splits the displacement signal into a plurality of displacement signals according to frequency bands of the displacement signal and amplifies the respective split displacement signals with individual amplification factors to output a plurality of correction signals for the respective frequency bands, and a control unit which drives the actuator based on a composite correction signal, in which the plurality of correction signals are composed, and corrects shake of an image according to relative displacement of the housing and the correction optical element.

It is preferable that the correction signal output unit amplifies each of the plurality of displacement signals based on signal output characteristics of the angular velocity sensor as the displacement sensor.

It is preferable that the control unit creates the composite correction signal by multiplying each of the plurality of correction signals by a coefficient and adding the plurality of correction signals. It is preferable that the coefficient is changed according to a selected correction mode.

It is preferable that the correction signal output unit has a filter which splits the displacement signal into at least first and second displacement signals according to frequency bands of the displacement signal, and an amplification unit which amplifies the first and second displacement signals with individual amplification factors and outputs at least first and second correction signals.

It is preferable that the correction signal output unit has a signal addition unit which outputs a third correction signal obtained by adding the first and second correction signals, and the control unit drives the actuator based on the composite correction signal in which the first, second, and third correction signals are composed. It is preferable that an erect prism is used as the correction optical element.

It is preferable that an observation device of the invention includes the above-described shake correction device.

According to the invention, the relative displacement of the housing and the correction optical element is measured by the displacement sensor, the displacement signal output from the displacement sensor is split into a plurality of displacement signals according to the frequency bands of the displacement signal by the correction signal output unit, the respective split displacement signals are amplified with the individual amplification factors to output a plurality of correction signals for the respective frequency bands, and the actuator is driven based on the composite correction signal, in which a plurality of correction signals are composed, to correct shake of an image due to oscillation applied to the housing; therefore, even when a plurality of types of oscillation having different frequency bands, such as hand shake and the rolling of a ship, are simultaneously applied, it is possible to appropriately correct shake of an image.

BRIEF DESCRIPTION OF THE DRAWINGS

FIG. 11 is an explanatory view of a table showing correspondence of shake correction modes and coefficients.

FIG. 15 is an explanatory view of a table showing correspondence of shake correction modes and coefficients of the second embodiment.

DESCRIPTION OF THE PREFERRED EMBODIMENTS

First Embodiment

Figure 1:
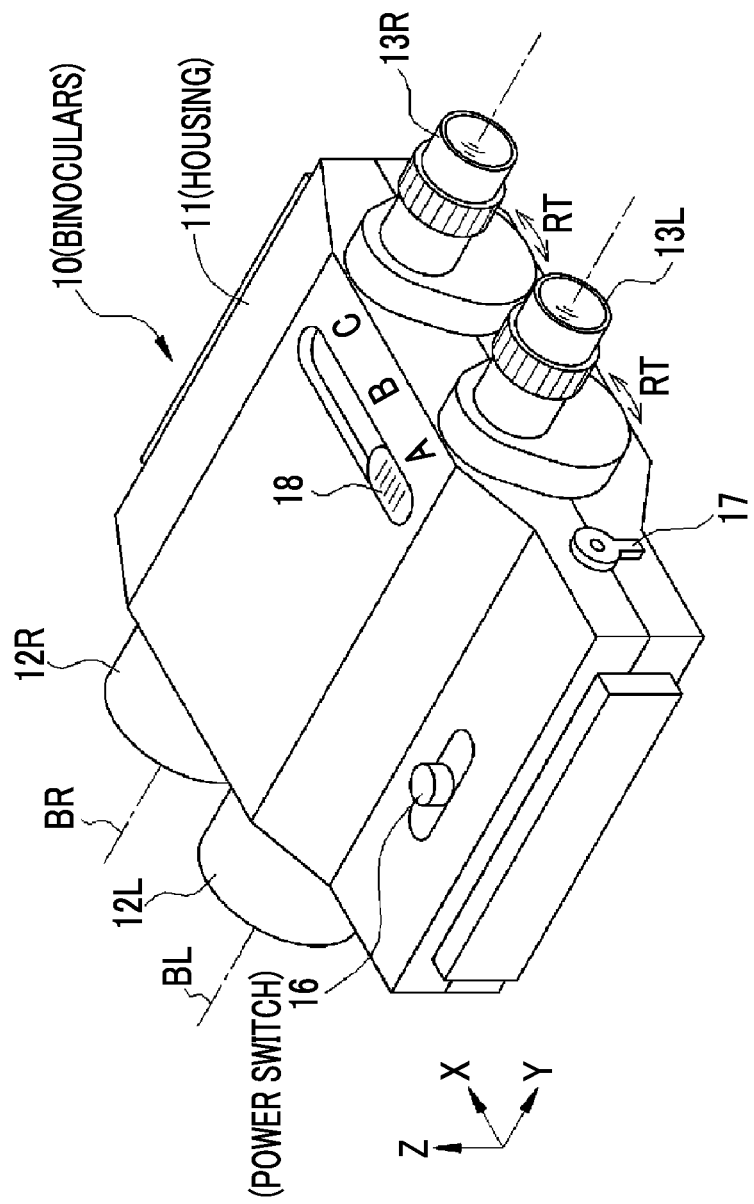
FIG. 1 is a perspective view showing an appearance shape of binoculars.

In FIG. 1, binoculars 10 which are an example of an observation device of the invention includes a substantially rectangular parallelepiped housing 11, and a pair of objective lens units 12R and 12L and a pair of ocular lens units 13R and 13L provided on the front and rear surfaces of the housing 11. The objective lens units 12R and 12L and the ocular lens units 13R and 13L are respectively disposed along a right-eye optical axis BR and a left-eye optical axis BL provided along the front-back direction (Y direction) of the binoculars 10 and constitute an observation optical system which enlarges an image of an object to be observed. With the binoculars 10, the user can observe the enlarged image of the object to be observed by holding the housing 11, turning the objective lens units 12R and 12L toward the object to be observed, and viewing the ocular lens units 13R and 13L.

The housing 11 is embedded with a shake correction device 30 (see FIG. 4) which corrects shake of an image due to oscillation, such as shake. A push button type power switch 16 which operates or stops the shake correction device 30 is provided on the upper left surface when viewed from the rear surface side of the housing 11. The power switch 16 outputs an on signal or an off signal according to the operation thereof. On the left side of the rear surface of the housing 11, an operation member 17 which is rotationally operated when correction optical elements 31R and 31L (see FIG. 4) of the shake correction device 30 are locked or released with respect to the housing 11 is provided. FIG. 1 shows a state where the operation member 17 is at a lock position where the correction optical elements 31R and 31L are locked, and a position which is rotated in a clockwise direction from the lock position becomes a release position where the lock is released.

In the upper surface on the rear surface side of the housing 11, a slide type mode switch 18 which switches among operation modes of the shake correction device 30 is provided. The operation modes switchable by the mode switch 18 are, for example, three types of "MODE A: LAND HANDHELD MODE", "MODE B: ON-BOARD HANDHELD MODE", and "MODE C: ON-BOARD FIXED MODE". The mode A is used when the user holds the binoculars 10 on land and performs observation, and shake of an image due to hand shake is primarily corrected. The mode B is used when the user holds the binoculars 10 on a ship and performs observation, and shake of an image due to hand shake and the rolling of the ship is corrected. The mode C is used when the user fixes the binoculars 10 to a tripod or the like on the ship and performs observation, and shake of an image due to rolling of the ship is primarily corrected.

Figure 2:
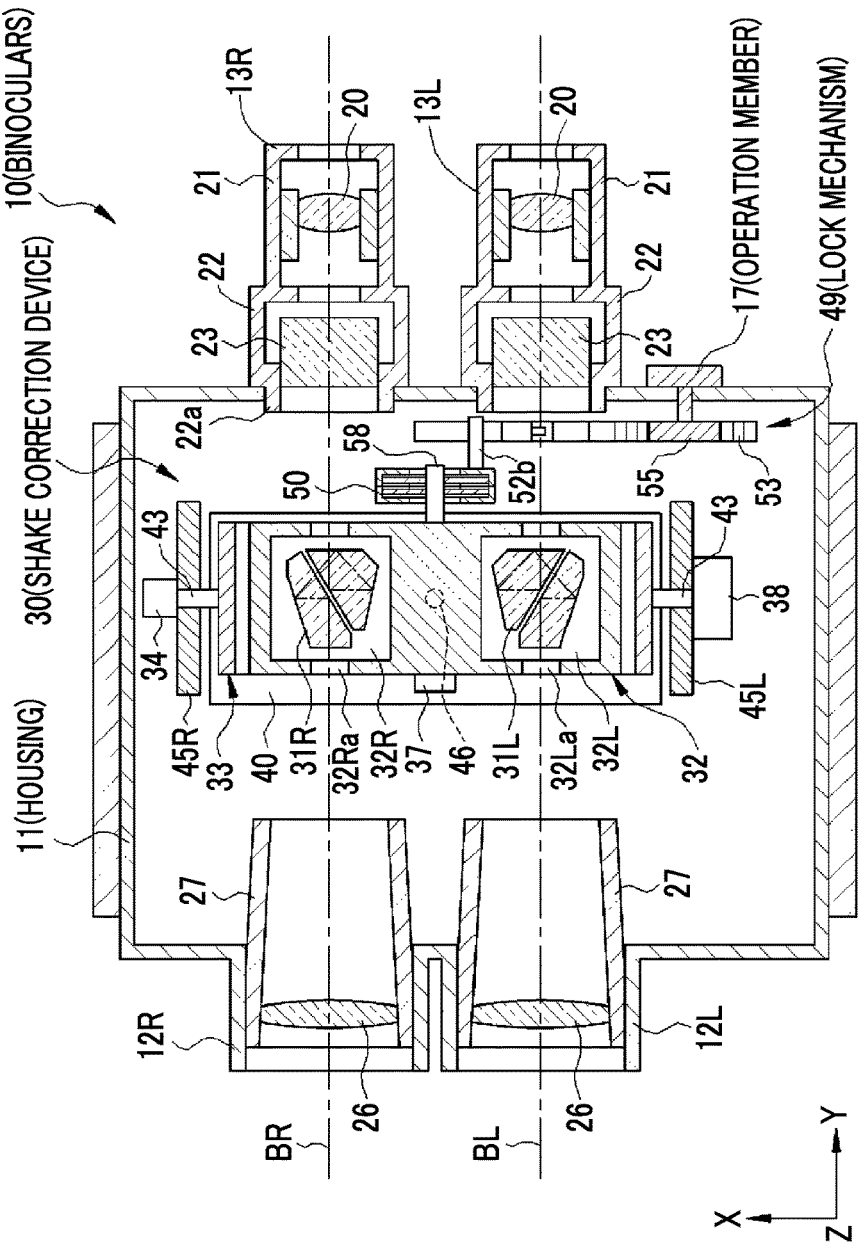
FIG. 2 is a horizontal sectional view of the binoculars.
Figure 3:
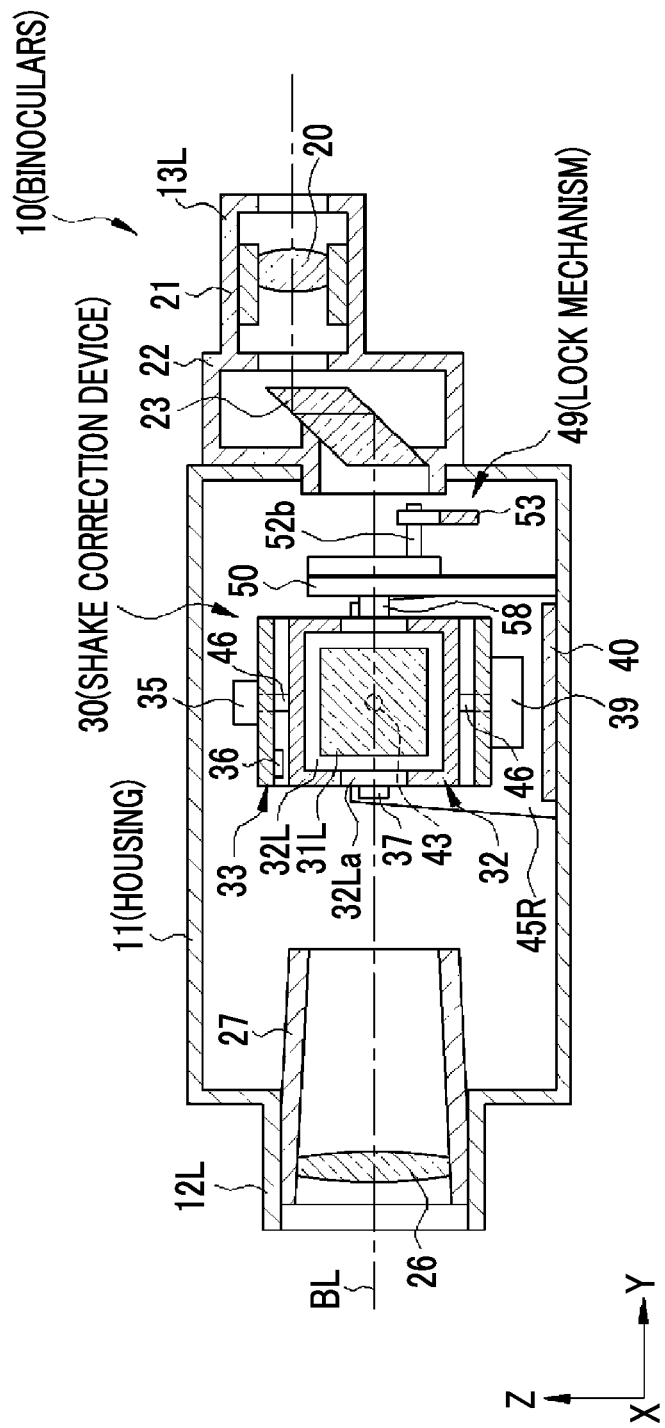
FIG. 3 is a vertical sectional view along a left-eye optical axis of the binoculars.

As shown in FIGS. 2 and 3 showing a horizontal section of the binoculars 10 and a vertical section along the left-eye optical axis BL, the ocular lens units 13R and 13L respectively include an ocular lens 20, an ocular cylinder 21 which holds the ocular lens 20, and a prism holder 22 coupled to the ocular cylinder 21. Each prism holder 22 holds a bending prism 23 which bends incident light and moves an optical axis in parallel, and has a rotary shaft part 22a. The rotary shaft parts 22a are fitted into openings provided in the housing 11 so as to be rotatable around optical axes BR and BL. Each ocular cylinder 21 is rotated along an arrow RT using the rotary shaft part 22a of the prism holder 22, whereby the mutual interval between a pair of ocular lenses 20 can be adjusted according to the eye width of the user.

The objective lens units 12R and 12L respectively include an objective lens 26, and an objective cylinder 27 which holds the objective lens 26. In FIGS. 2 and 3, although only a part of the ocular lens 20 and the objective lens 26 is shown, actually, both the ocular lens 20 and the objective lens 26 can be constituted of a plurality of lens groups.

Figure 4:
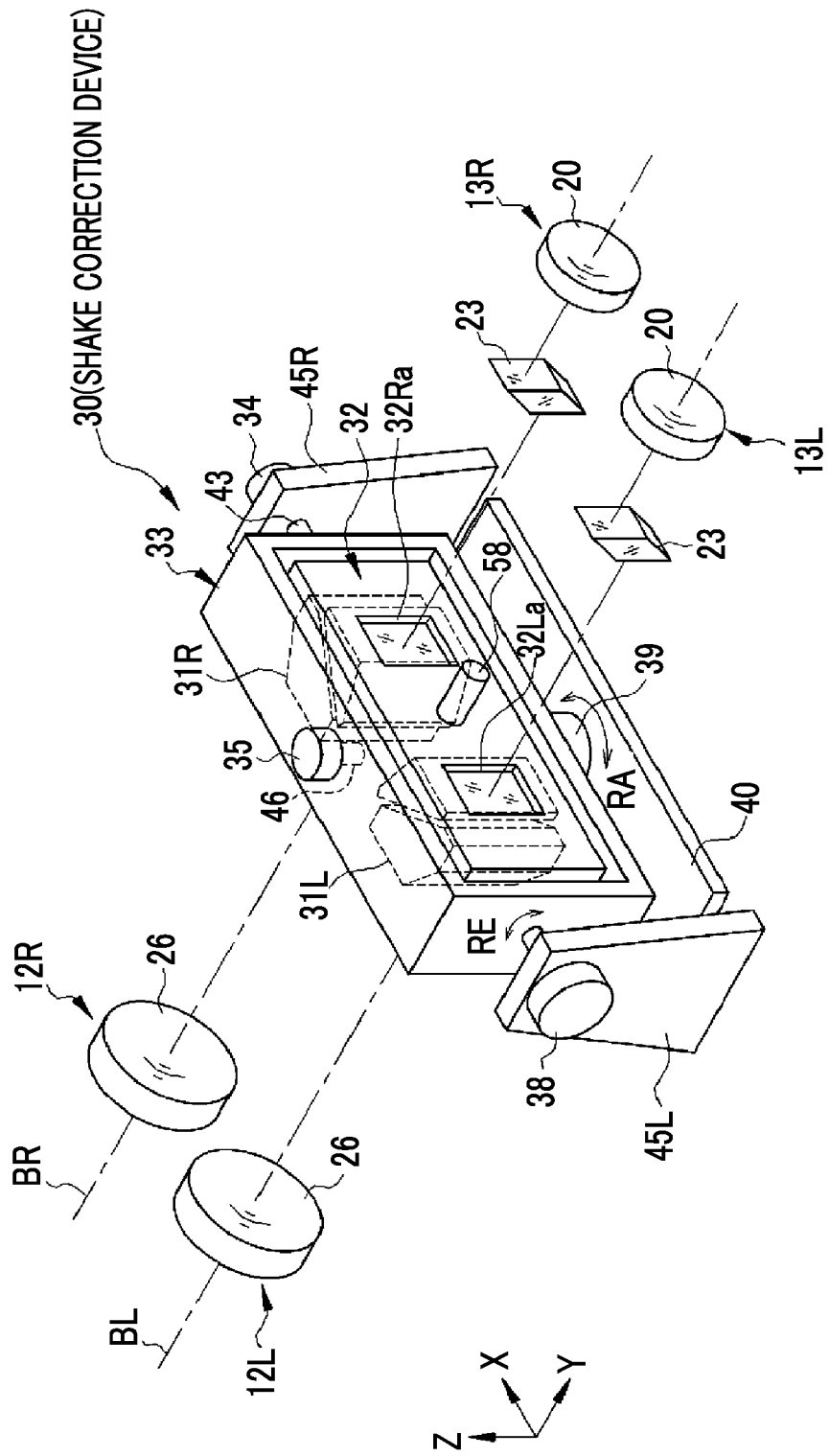
FIG. 4 is a perspective view showing the configuration of a shake correction device.

As shown in FIG. 4, the shake correction device 30 is disposed between the objective lens units 12R and 12L and the ocular lens units 13R and 13L. The shake correction device 30 includes the correction optical elements 31R and 31L which are displaceably provided between the objective lens 26 and the ocular lens 20 fixed to the housing 11. The correction optical elements 31R and 31L are disposed along the right-eye optical axis BR and the left-eye optical axis BL. The correction optical elements 31R and 31L are, for example, roof prism type erect prisms, and restore an inverted image formed by the objective lens 26 and the ocular lens 20 to an erect image. As the correction optical elements 31R and 31L, Porro prism type erect prisms may be used, and erect lenses may be used instead of the erect prisms.

The correction optical elements 31R and 31L are displaceably supported by an inner holding frame 32 and an outer holding frame 33 holding the inner holding frame 32. The inner holding frame 32 has a parallelepiped shape and is disposed such that the longitudinal direction thereof follows a horizontal direction (X direction) orthogonal to the right-eye optical axis BR and the left-eye optical axis BL. The inner holding frame 32 is rotatable in a direction (azimuth direction) of an arrow RA around the Z axis (first axis) by a rotating shaft 46 provided in the outer holding frame 33 along the Z direction orthogonal to the X direction and the Y direction.

The inner holding frame 32 is provided with element housing parts 32R and 32L respectively disposed on the right-eye optical axis BR and the left-eye optical axis BL. The correction optical elements 31R and 31L are respectively housed in the element housing parts 32R and 32L. In the front surface (the surface facing the objective lens 26) and the rear surface (the surface facing the ocular lens 20) of the inner holding frame 32, openings 32Ra and 32La for exposing the correction optical elements 31R and 31L housed in the element housing parts 32R and 32L on the right-eye optical axis BR and the left-eye optical axis BL are respectively provided.

The outer holding frame 33 has a parallelepiped shape like the inner holding frame 32 and is disposed such that the longitudinal direction follows the X direction. The outer holding frame 33 has a frame shape only having an upper surface portion, a lower surface portion, and side surface portions parallel to the right-eye optical axis BR and the left-eye optical axis BL, and the inner holding frame 32 is rotatably housed inside the outer holding frame 33. The outer holding frame 33 is rotatable in a direction (elevation direction) of an arrow RE around the X axis (second axis) by a rotating shaft 43 provided along the X direction. The rotating shaft 43 is supported by a pair of bearing parts 45R and 45L provided in the housing 11. With this, the correction optical elements 31R and 31L are supported so as to be rotatable around two axes of the X axis and the Z axis orthogonal to each other in a plane orthogonal to the right-eye optical axis BR and the left-eye optical axis BL.

The shake correction device 30 includes a Z-axis angular position sensor 35, a Z-axis angular velocity sensor 37, an X-axis angular position sensor 34, and an X-axis angular velocity sensor 36 which measure an angular position and an angular velocity changing with relative rotation between the housing 11 and the correction optical elements 31R and 31L for the respective two axes (Z axis and X axis). The Z-axis angular position sensor 35 is attached to the outer holding frame 33 and connected to one end of the rotating shaft 46 to measure the angular position of the inner holding frame 32 around the Z axis. The Z-axis angular velocity sensor 37 is provided in the front surface of the inner holding frame 32 to detect the angular velocity of the inner holding frame 32 around the Z axis. The X-axis angular position sensor 34 is attached to the bearing part 45R and connected to one end of the rotating shaft 43 to measure the angular position of the outer holding frame 33 around the X axis. The X-axis angular velocity sensor 36 is provided in the upper surface of the inner wall of the outer holding frame 33 to detect the angular velocity of the outer holding frame 33 around the X axis. The X-axis angular velocity sensor 36 and the Z-axis angular velocity sensor 37 correspond to a displacement sensor of the invention.

For the X-axis angular position sensor 34 and the Z-axis angular position sensor 35, for example, a rotary position sensor, a resolver, a synchro, a rotary encoder, or the like is used. For the X-axis angular velocity sensor 36 and the Z-axis angular velocity sensor 37, for example, a piezoelectric oscillation gyro sensor which has a column-like prismatic oscillator and a plurality of piezoelectric ceramics, and uses the Coriolis force is used. Instead of the piezoelectric oscillation gyro sensor using the column-like oscillator, a piezoelectric oscillation gyro sensor using a triangular prismatic oscillator, a quadrangular prismatic oscillator, or a tuning fork-like oscillator may be used.

The shake correction device 30 includes a Z-axis actuator 39 and an X-axis actuator 38 which rotate the correction optical elements 31R and 31L around the two axes (Z axis and X axis). The Z-axis actuator 39 is, for example, a motor, and is attached to the outer holding frame 33 and connected to one end of the rotating shaft 46. The X-axis actuator 38 is a motor like the Z-axis actuator 39, and is attached to the bearing part 45L and connected to one end of the rotating shaft 43. The Z-axis actuator 39 and the X-axis actuator 38 respectively rotate the inner holding frame 32 and the outer holding frame 33 through the rotating shafts 46 and 43, thereby rotating the correction optical elements 31R and 31L around the Z axis and the X axis.

Figure 5:
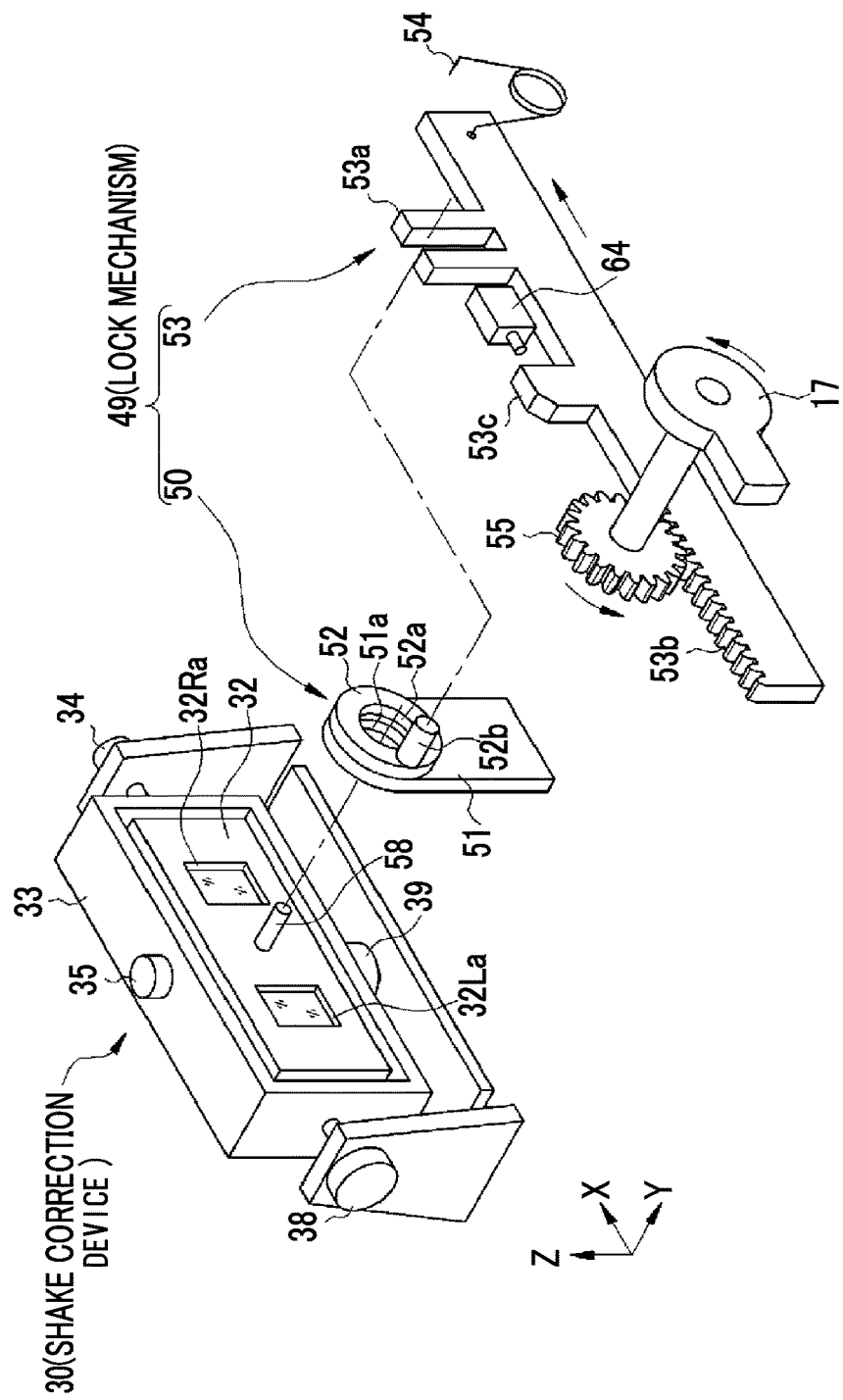
FIG. 5 is a perspective view showing the configuration of a lock mechanism.

As shown in FIG. 5, the shake correction device 30 includes a lock mechanism 49 between the ocular lens units 13R and 13L and the correction optical elements 31R and 31L in the housing 11. The lock mechanism 49 operates mechanically in cooperation with the movement of the operation member 17 to lock the correction optical elements 31R and 31L at reference positions set between the objective lens units 12R and 12L and the ocular lens units 13R and 13L or to release the lock. The reference positions of the correction optical elements 31R and 31L refer to positions where the optical axes of the erect prisms used as the correction optical elements 31R and 31L are parallel to the right-eye optical axis BR and the left-eye optical axis BL of the objective lens units 12R and 12L and the ocular lens units 13R and 13L. The lock mechanism 49 includes a clamping mechanism 50, a slide rack 53, a stop holding member 54, and a gear 55.

The clamping mechanism 50 clamps and unclamps a fixing pin 58 provided in the rear surface of the inner holding frame 32, thereby locking and releasing the correction optical elements 31R and 31L. The clamping mechanism 50 has a board part 51 fixed to the housing 11, a rotating ring 52 disposed on the rear surface side (ocular lens side) of the board part 51, and three claw members 56 (see FIG. 6) incorporated between the board part 51 and the rotating ring 52. The board part 51 and the rotating ring 52 are respectively provided with circular openings 51a and 52a into which the fixing pin 58 is inserted. The rotating ring 52 is provided so as to be rotatable around the opening 52a with respect to the board part 51. The three claw members 56 are supported by rotating shafts provided in the board part 51 and the rotating ring 52 (not shown), and rotate with respect to the rotating shaft of the board part 51 with the rotation of the rotating ring 52, thereby protruding into or being retreated from the openings 51a and 52a.

Figure 6:
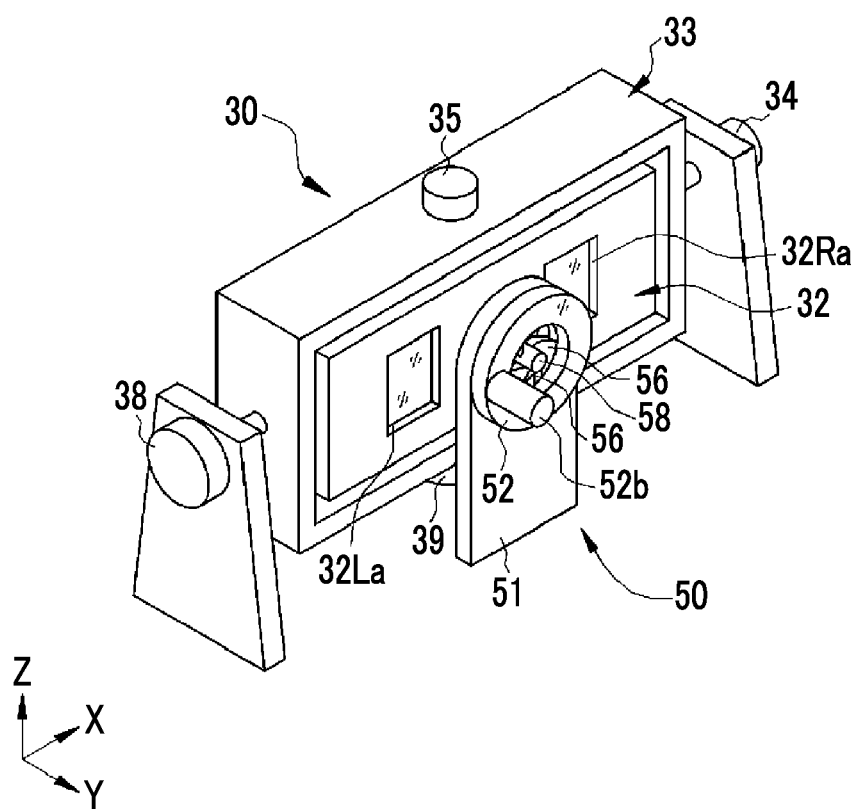
FIG. 6 is a perspective view showing a locked state of the lock mechanism.

At the retreat position where the claw members 56 are retreated from the openings 51a and 52a, the fixing pin 58 is movable in the openings 51a and 52a; therefore, the lock of the correction optical elements 31R and 31L is released. As shown in FIG. 6, at a clamp position where the claw members 56 protrude into the openings 51a and 52a, the fixing pin 58 is clamped by the claw members 56, the correction optical elements 31R and 31L are locked at the reference positions.

The slide rack 53 moves according to a rotating operation of the operation member 17, thereby driving the clamping mechanism 50. The slide rack 53 is supported by the housing 11 so as to be slidable in the X direction. In the upper surface on one end side of the slide rack 53, a rack gear 53b extending in the X direction is provided. The gear 55 coaxially provided for the operation member 17 meshes with the rack gear 53b. The gear 55 rotates in the same direction by the rotating operation of the operation member 17, and the rack gear 53b moves accordingly, whereby the slide rack 53 slides in the X direction.

In the upper surface on the other side of the slide rack 53, a pair of protrusions 53a extending in the Z direction are provided. A ring pin 52b which is erected along the Y direction in the rear surface of the rotating ring 52 is inserted between a pair of protrusions 53a. Accordingly, if the slide rack 53 slides, the rotating ring 52 rotates in conjunction with the sliding of the slide rack 53. If the rotating ring 52 rotates, the three claw members 56 move between the clamp position and the retreat position to clamp or unclamp the fixing pin 58; therefore, the correction optical elements 31R and 31L are locked at the reference positions or released.

A protrusion 53c is provided to protrude in the Z direction between a pair of protrusions 53a of the slide rack 53 and the rack gear 53b. On a side of the protrusion 53c in the X direction, a state sensor 64 constituted of a micro switch is disposed. The state sensor 64 is used to detect an activation start timing of the shake correction device 30. The state sensor 64 detects the lock and release of the correction optical elements 31R and 31L when the slide rack 53 slides and is pressed to or released from the protrusion 53c, and outputs a lock signal or a release signal. As the state sensor 64, in addition to a contact type detection switch, such as a micro switch, a noncontact type sensor using light or magnetism may be used.

If the operation member 17 is stopped in the middle of the lock position and the release position, the slide rack 53 releases the lock of the correction optical elements 31R and 31L, and is likely to be stopped at a position not detected by the state sensor 64. In this state, the correction optical elements 31R and 31L in the housing 11 rotate freely and may be damaged. For this reason, in this embodiment, the slide rack 53 is pressed toward both end portions in the slide direction by the stop holding member 54 such that the slide rack 53 is not stopped at the middle position described above. The stop holding member 54 is, for example, a toggle spring formed by bending a metal thin wire, and when the slide rack 53 is stopped in the middle of sliding, the stop holding member 54 is pressed toward the end portion in the slide direction to forcibly slide.

Figure 7:
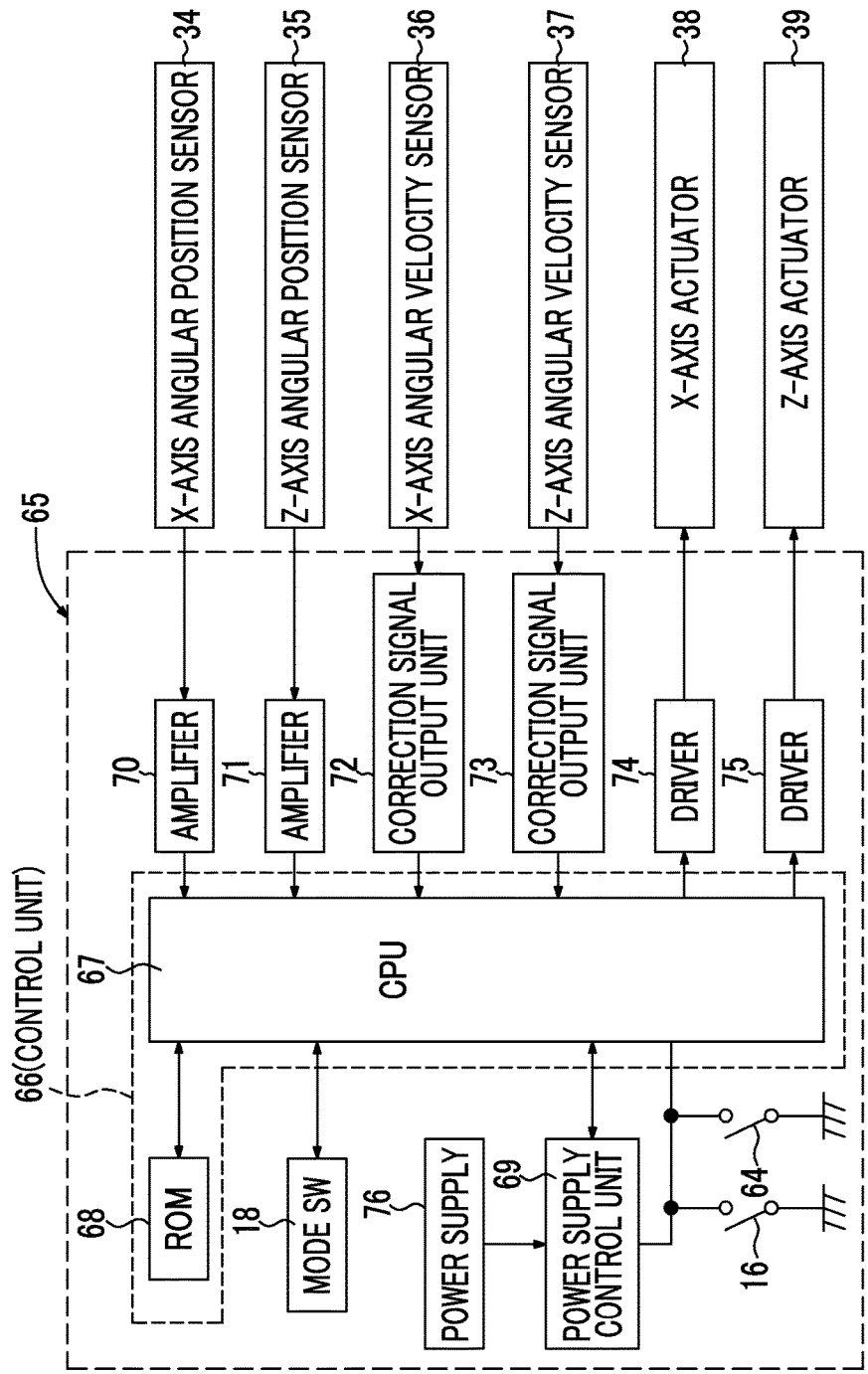
FIG. 7 is a block diagram showing the electrical configuration of the binoculars.

The shake correction device 30 includes a control board 40 for controlling the shake correction device 30 below the correction optical elements 31R and 31L. The control board 40 is provided with a control circuit 65 shown in FIG. 7. The control circuit 65 includes a control unit 66, a power supply control unit 69, amplifiers 70 and 71, correction signal output units 72 and 73, and drivers 74 and 75. The control unit 66 includes a CPU 67, and a ROM 68 which stores a control program or various kinds of data, and the CPU 67 integrally controls the shake correction device 30 based on the control program. The signals of the power switch 16, the mode switch 18, and the state sensor 64 are input to the CPU 67.

The power supply control unit 69 performs power supply control of the shake correction device 30. The power supply control unit 69 supplies operating power from the power supply 76 to the control unit 66, the X-axis angular position sensor 34 and the Z-axis angular position sensor 35, the X-axis angular velocity sensor 36 and the Z-axis angular velocity sensor 37, and the X-axis actuator 38 and the Z-axis actuator 39 according to the on signal of the power switch 16 or the release signal of the state sensor 64, and operates the shake correction device 30.

If the shake correction device 30 is placed in an off state in a state where the lock of the correction optical elements 31R and 31L is released, the correction optical elements 31R and 31L in the housing 11 rotate freely and may be damaged. For this reason, when the supply of operating power to the shake correction device 30 by the power supply control unit 69 is started by a latch operation of a latch relay (not shown), the power supply control unit 69 maintains the supply of operating power to the shake correction device 30 by the power supply control unit 69 until an AND state in which the on signal of the power switch 16 and the lock signal of the state sensor 64 are input together is placed. With this, even if the lock signal is input from the state sensor 64 in a state where the on signal is input from the power switch 16, or even if the on signal is input from the power switch 16 in a state where the release signal is input from the state sensor 64, the supply of operating power to the shake correction device 30 by the power supply control unit 69 is not stopped. Accordingly, the shake correction device 30 is not placed in the off state in a state where the lock of the correction optical elements 31R and 31L is released.

The amplifiers 70 and 71 amplify the angular position signals of the X-axis angular position sensor 34 and the Z-axis angular position sensor 35 and input the angular position signals to the CPU 67. The correction signal output units 72 and 73 inputs the correction signals split and amplified from the angular velocity signals of the X-axis angular velocity sensor 36 and the Z-axis angular velocity sensor 37 for the respective frequency bands to the CPU 67. The drivers 74 and 75 are controlled by the CPU 67 and drive the X-axis actuator 38 and the Z-axis actuator 39.

Figure 8:
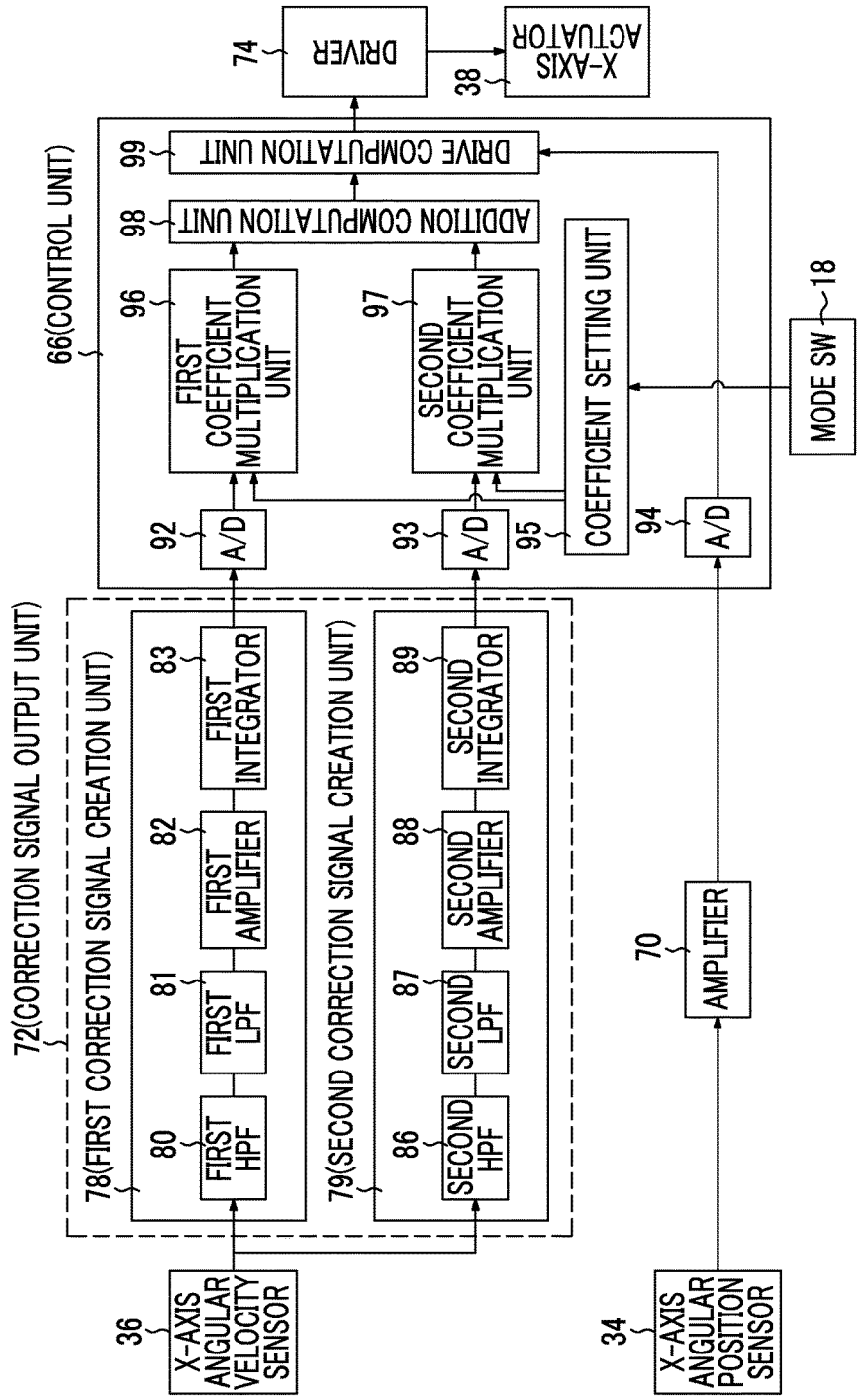
FIG. 8 is a block diagram showing the configuration of a correction signal output unit and a control unit.
Figure 9:
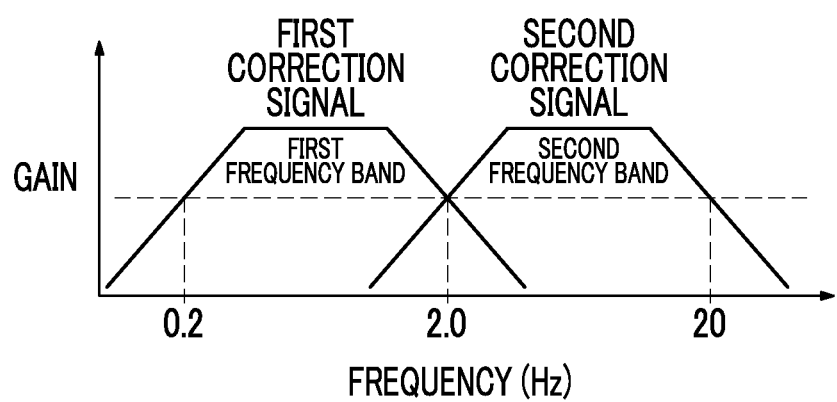
FIG. 9 is a graph showing frequency bands of first and second correction signals.

As shown in FIG. 8, the correction signal output unit 72 connected to the X-axis angular velocity sensor 36 includes a first correction signal creation unit 78 which creates a correction signal of a first frequency band from the angular velocity signal, and a second correction signal creation unit 79 which creates a correction signal of a second frequency band. As shown in FIG. 9, the first frequency band is a band of an ultra low frequency (0.2 Hz) to a low frequency (2 Hz), and the second frequency band is a band of a low frequency (2 Hz) to a high frequency (20 Hz).

A first HPF (High-pass filter) 80 of the first correction signal creation unit 78 is a filter which has an ultra low frequency (for example, 0.2 Hz) as a cutoff frequency, and cuts off an angular velocity signal of 0.2 Hz or lower. A first LPF (Low-pass filter) 81 is a filter which has a low frequency (for example, 2 Hz) as a cutoff frequency, and cuts off an angular velocity signal of 2 Hz or higher. With this, the first correction signal creation unit 78 splits the first frequency band of an ultra low frequency to a low frequency from an angular velocity signal. A first amplifier 82 amplifies the angular velocity signal of the first frequency band based on the signal output characteristics of the X-axis angular velocity sensor 36. A first integrator 83 integrates the amplified angular velocity signal of the first frequency band to create a first correction signal representing the amount of displacement of the correction optical elements 31R and 31L around the X axis due to the oscillation of the first frequency band.

A second HPF 86 of the second correction signal creation unit 79 is a filter which has a low frequency (for example, 2 Hz) as a cutoff frequency, and transmits an angular velocity signal of 2 Hz or higher. A second LPF 87 is a filter which has a high frequency (for example, 20 Hz) as a cutoff frequency, and transmits an angular velocity signal of 20 Hz or lower. With this, the second signal creation unit 79 splits a second frequency band of a low frequency to a high frequency from an angular velocity signal. A second amplifier 88 amplifies the angular velocity signal of the second frequency band based on the signal output characteristics of the X-axis angular velocity sensor 36. A second integrator 89 integrates the amplified angular velocity signal of the second frequency band to create a second correction signal representing the amount of displacement of the correction optical elements 31R and 31L around the X axis due to the oscillation of the second frequency band. The first and second integrators 83 and 89 may be provided in the CPU 67 described below, instead of the first and second correction signal creation units 78 and 79.

Figure 10:
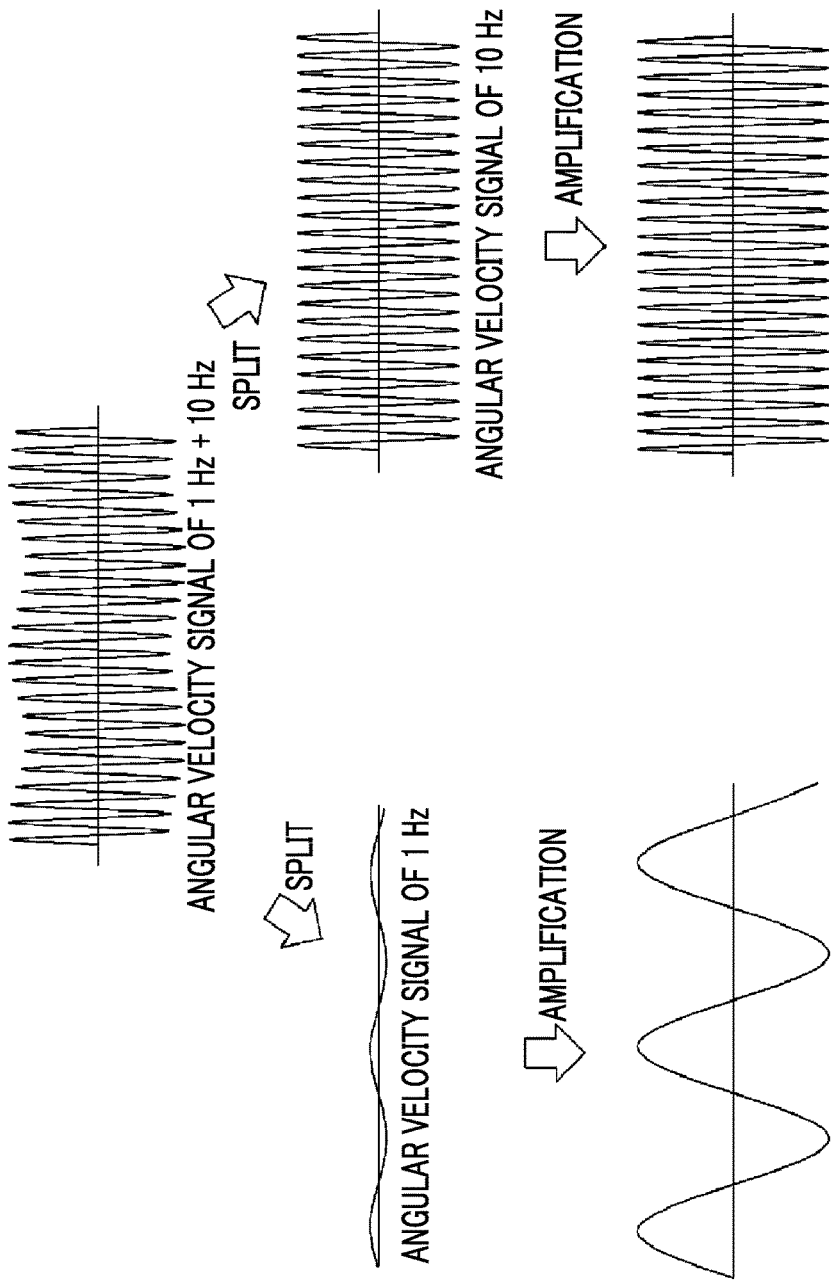
FIG. 10 is an explanatory view showing split and amplification of angular velocity signals by the correction signal output unit.
Figure 16:
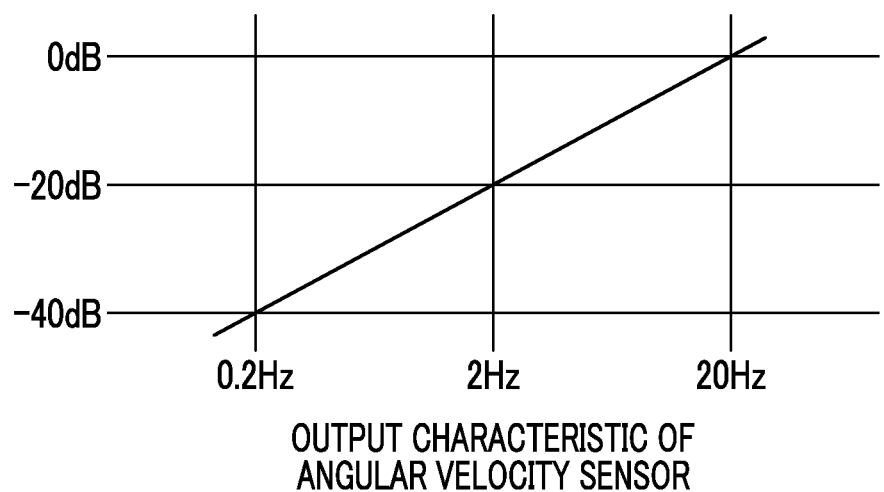
FIG. 16 is a graph showing signal output characteristics of an angular velocity sensor.
Figure 17:
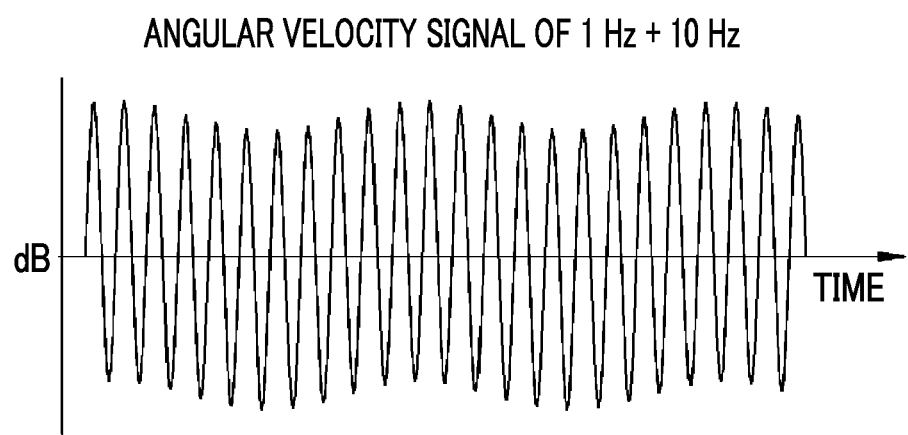
FIG. 17 is a graph showing an angular velocity signal of an angular velocity sensor when measuring oscillation of 1 Hz and 10 Hz.

An angular velocity signal shown in FIG. 10 is obtained by detecting oscillation of 10 Hz due to hand shake and oscillation of 1 Hz due to the rolling of the ship, and if the angular velocity signal is split by the first correction signal creation unit 78 and the second correction signal creation unit 79, the angular velocity signal is split into the angular velocity signal of 1 Hz (first frequency band) and the angular velocity signal of the 10 Hz (second frequency band). As shown in FIG. 16, since the angular velocity sensor has the output value of the angular velocity signal changing according to the frequency of oscillation, the signal value of the angular velocity signal of 1 Hz becomes one tenth of the angular velocity signal of 10 Hz. The first amplifier 82 amplifies the angular velocity signal of 1 Hz based on the signal output characteristics of the angular velocity sensor such that the signal value of the angular velocity signal of 1 Hz becomes the same level as the signal value of the angular velocity signal of 10 Hz amplified by the second amplifier 88.

The control unit 66 functions as A/D converters 92 to 94, a coefficient setting unit 95, a first coefficient multiplication unit 96, a second coefficient multiplication unit 97, an addition computation unit 98, and a drive computation unit 99 when the CPU 67 operates based on the control program stored in the ROM 68. The A/D converters 92 to 94 convert the first and second correction signals and the angular position signal of the X-axis angular position sensor 34 to digital signals. The first coefficient multiplication unit 96 and the second coefficient multiplication unit 97 respectively multiply the first and second correction signals by coefficients set by the coefficient setting unit 95 and weight the first and second correction signals.

The addition computation unit 98 outputs a composite correction signal by adding the first correction signal and the second correction signal multiplied by the coefficients. The drive computation unit 99 creates a drive signal of the X-axis actuator 38 based on the composite correction signal and the angular position signal of the X-axis angular position sensor 34 in order to correct shake around the X axis in the image of the observation optical system. The driver 74 drives the X-axis actuator 38 based on the drive signal created by the drive computation unit 99.

The coefficient setting unit 95 sets the coefficients of the first coefficient multiplication unit 96 and the second coefficient multiplication unit 97 according to the setting of the mode switch 18, for example, with reference to a table 102 shown in FIG. 11. The table is stored in, for example, the ROM 68. With this, it is possible to set which of shake of the image due to the oscillation of the first frequency band and shake of the image due to the oscillation of the second frequency band is intensively corrected.

When the mode switch 18 is set to "MODE A: LAND HANDHELD MODE", almost all of the oscillation measured by the X-axis angular velocity, sensor 36 is caused by hand shake; therefore, the coefficient setting unit. 95 sets the coefficient of "0.2" in the first coefficient multiplication unit 96 and sets the coefficient of "0.8" in the second coefficient multiplication unit 97. When the mode switch 18 is set to "MODE B: ON-BOARD HANDHELD MODE", the oscillation due to hand shake and the oscillation due to the rolling of the ship are measured by the X-axis angular velocity sensor 36; therefore, the coefficient setting unit 95 sets the coefficient of "0.5" in both of the first coefficient multiplication unit 96 and the second coefficient multiplication unit 97. When "MODE C: ON-BOARD FIXED MODE" is set, almost all of the oscillation measured by the X-axis angular velocity sensor 36 is caused by the rolling of the ship; therefore, the coefficient setting unit 95 sets the coefficient of "0.8" in the first coefficient multiplication unit 96 and sets the coefficient of "0.2" in the second coefficient multiplication unit 97.

The correction signal output unit 73 of the Z-axis angular velocity sensor 37 has the same configuration as the correction signal output unit 72 of the X-axis angular velocity sensor 36, and each configuration of the control unit 66 which processes the angular velocity signal of the Z-axis angular velocity sensor 37 is the same configuration as when processing the angular velocity signal of the X-axis angular velocity sensor 36; therefore, detailed description referring to the drawings will not be repeated.

Figure 12:
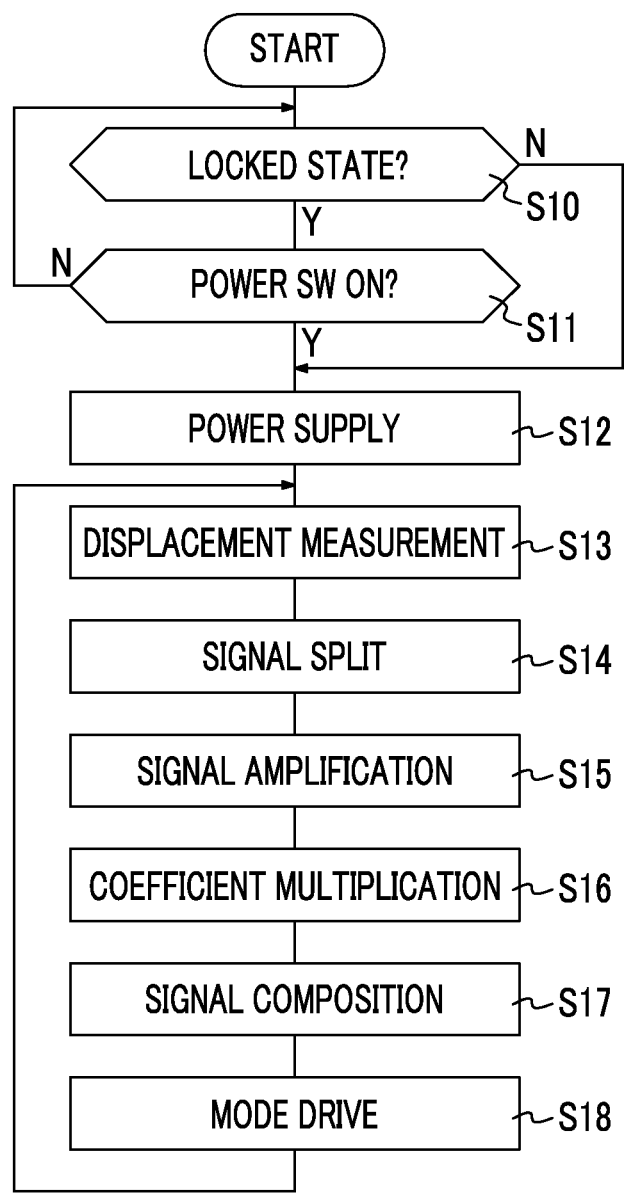
FIG. 12 is a flowchart showing a procedure of shake correction.

Next, the action of the embodiment described above will be described referring to the flowchart of FIG. 12. When the binoculars 10 are not in use, since the operation member 17 is at the lock position, the correction optical elements 31R and 31L are locked at the reference positions by the lock mechanism 49 (YES in S10). Since the power switch 16 is not operated, the shake correction device 30 does not operate (NO in S11).

If the operation member 17 rotates to the release position, the gear 55 rotates in the same direction, and the slide rack 53 having the rack gear 53b in mesh with the gear 55 starts to slide. Since the slide rack 53 is pressed to the stop holding member 54 in the middle of sliding and moves to the end portion in the slide direction, the slide rack 53 is not stopped in the middle of sliding. The sliding of the slide rack 53 makes the rotating ring 52 of the clamping mechanism 50 rotate and makes the three claw members 56 move to the retreat position to be retreated from the openings 51a and 52a. With this, the lock of the correction optical elements 31R and 31L by the lock mechanism 49 is released (NO in S10).

When the lock mechanism 49 is released and the release signal is input from the state sensor 64 (NO in S10), or when the power switch 16 is operated and the on signal is input (YES in S11), the power supply control unit 69 supplies operating power from the power supply 76 to the respective units of the shake correction device 30 (S12).

The X-axis angular position sensor 34 and the Z-axis angular position sensor 35, and the X-axis angular velocity sensor 36 and the Z-axis angular velocity sensor 37 starts measurement of displacement of the posture of the inner holding frame 32 and the outer holding frame 33 (S13). The first correction signal creation unit 78 which processes the angular velocity signal of the X-axis angular velocity sensor 36 cuts off the angular velocity signal of 0.2 Hz or lower with the first HPF 80 and cuts off the angular velocity signal of 2 Hz or higher with the first LPF 81 to split the first frequency band of an ultra low frequency to a low frequency from the angular velocity signal (S14). The first amplifier 82 amplifies the angular velocity signal of the first frequency band based on the signal output characteristics of the X-axis angular velocity sensor 36 such that the signal value of the angular velocity signal of the first frequency band becomes the same level as the signal value of the angular velocity signal of the second frequency band amplified by the second amplifier 88 (S15). The first integrator 83 integrates the angular velocity signal of the first frequency band to create the first correction signal representing the amount of displacement of the correction optical elements 31R and 31L around the X axis due to the oscillation of the first frequency band.

The second correction signal creation unit 79 cuts off the angular velocity signal of 2 Hz or lower with the second HPF 86 and cuts off the angular velocity signal of 20 Hz or higher with the second LPF 87 in parallel with the first correction signal creation unit 78 to split the second frequency band of a low frequency to a high frequency from the angular velocity signal (S14). The second amplifier 88 amplifies the angular velocity signal of the second frequency band based on the signal output characteristics of the X-axis angular velocity sensor 36 (S15). The second integrator 89 integrates the angular velocity signal of the second frequency band to create the second correction signal representing the amount of displacement of the correction optical elements 31R and 31L around the X axis due to the oscillation of the second frequency band.

The A/D converters 92 to 94 convert the first and second correction signals and the amplified angular position signal of the X-axis angular position sensor 34 to digital signals. The coefficient setting unit 95 sets the coefficients of the first coefficient multiplication unit 96 and the second coefficient multiplication unit 97 with reference to the table 102 according to the setting of the mode switch 18. When the mode switch 18 is set to "MODE B: ON-BOARD HANDHELD MODE", the coefficient setting unit 95 sets the coefficient of "0.5" in both of the first coefficient multiplication unit 96 and the second coefficient multiplication unit 97. The first coefficient multiplication unit 96 and the second coefficient multiplication unit 97 respectively multiply the first and second correction signals by the coefficients set by the coefficient setting unit 95 and weight the first and second correction signals (S16).

The addition computation unit 98 creates the composite correction signal by adding the first and second correction signals multiplied by the coefficients (S17). The drive computation unit 99 creates the drive signal of the X-axis actuator 38 based on the composite correction signal and the angular position signal of the X-axis angular position sensor 34 in order to correct shake around the X axis in the image of the observation optical system. The driver 74 drives the X-axis actuator 38 based on the drive signal created by the drive computation unit 99 (S18). The X-axis actuator 38 performs control so as to return the correction optical elements 31R and 31L in the opposite direction of the displacement due to oscillation and to fix the correction optical elements 31R and 31L with respect to the earth; therefore, shake around the X axis in the image of the observation optical system is corrected.

In the shake correction device, simultaneously with shake correction of the image around the X axis, shake correction around the Z axis is also performed. The first and second correction signal creation units of the correction signal output unit 73 split the angular velocity signal of the Z-axis angular velocity sensor 37 into the first and second frequency bands (S14), amplify the angular velocity signals of the first and second frequency bands according to the signal output characteristics of the Z-axis angular velocity sensor 37 (S15), and integrate the angular velocity signals of the first and second frequency bands to output the first and second correction signals. The amplifier 71 amplifies the angular position signal of the Z-axis angular position sensor 35.

The A/D converters convert the first and second correction signals and the angular position signal of the X-axis angular position sensor 34 to digital signals. The coefficient setting unit 95 sets the first and second coefficients according to the setting of the mode switch 18. The first coefficient multiplication unit and the second coefficient multiplication unit multiply the first and second correction signals by the set coefficients (S16). The addition computation unit 98 creates the composite correction signal by adding the first and second correction signals multiplied by the coefficients (S17). The drive computation unit 99 creates the drive signal of the X-axis actuator 38 based on the composite correction signal and the angular position signal of the X-axis angular position sensor 34 in order to correct shake around the X axis in the image of the observation optical system.

The driver 75 drives the Z-axis actuator 39 based on the drive signal created by the drive computation unit 99 (S18). The Z-axis actuator 39 performs control so as to return the correction optical elements 31R and 31L in the opposite direction of the displacement due to oscillation and to fix the correction optical elements 31R and 31L with respect to the earth; therefore, shake around the Z axis in the image of the observation optical system is corrected.

According to the above-described embodiment, oscillation applied to the housing 11 is measured by the X-axis angular velocity sensor 36 and the Z-axis angular velocity sensor 37, the angular velocity signals output from the X-axis angular velocity sensor 36 and the Z-axis angular velocity sensor 37 are split into a plurality of angular velocity signals according to the frequency bands by the correction signal output units 72 and 73, and the respective split angular velocity signals are amplified with individual amplification factors to output the correction signals for the respective frequency bands. The X-axis actuator 38 and the Z-axis actuator 39 are driven based on the composite correction signal in which the amplified correction signals are composed by the addition computation unit 98 of the control unit 66, and shake of the image according to the relative displacement of the housing 11 and the correction optical elements 31R and 31L. Therefore, even when a plurality of types of oscillation having different frequency bands, such as hand shake and the rolling of the ship, are simultaneously applied to the binoculars 10, it is possible to appropriately correct shake of the image.

In the correction signal output units 72 and 73, since the angular velocity signals split for the respective frequency bands are amplified based on the signal output characteristics of the X-axis angular velocity sensor 36 and the Z-axis angular velocity sensor 37 such that the signal values of the angular velocity signals become the same level, it is possible to make the signal value of the angular velocity signal of the low frequency band have the same level as the angular velocity signal of the high frequency band. Therefore, it is also possible to appropriately correct shake of the image due to the oscillation of the low frequency band.

Furthermore, since the composite correction signals are created by multiplying a plurality of correction signals by the coefficients and adding a plurality of correction signals, it is possible to perform shake correction subjected to weighting for each frequency band. In addition, since the coefficients are changed according to the modes set corresponding to the frequency bands, it is possible to integrally set the coefficients of the respective correction signals only by setting the modes.

Second Embodiment

Figure 13:
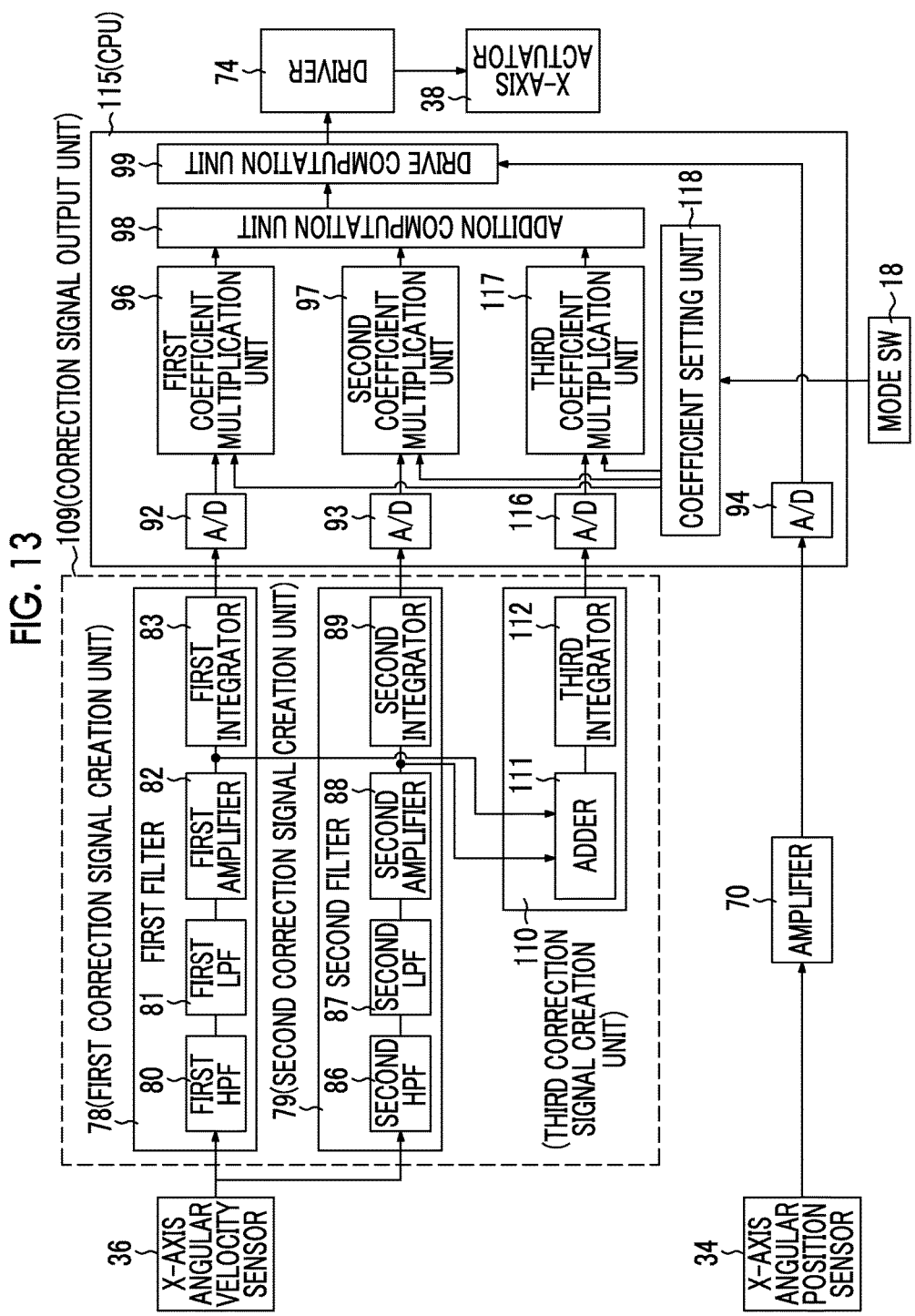
FIG. 13 is a block diagram showing functions of a correction signal output unit and a CPU of a second embodiment.

Next, a second embodiment of the invention will be described. The same configurations as those in the first embodiment are represented by the same reference numerals, and detailed description thereof will not be repeated. As shown in FIG. 13, in this embodiment, a correction signal output unit 109 which has a third correction signal creation unit 110 along with the first correction signal creation unit 78 and the second correction signal creation unit 79 is provided. The third correction signal creation unit 110 has an adder 111 which outputs an added angular velocity signal, in which the angular velocity signal of the first frequency band amplified by the first amplifier 82 and the angular velocity signal of the second frequency band amplified by the second amplifier 88, and a third integrator 112 which integrates the added angular velocity signal to create a third correction signal representing the amount of displacement of the correction optical elements 31R and 31L around the X axis due to the oscillation of the first and second frequency bands. The first to third integrators 83, 89, and 112 may be provided in a CPU 115 described below, instead of the first to third correction signal creation units 78, 79, and 110.

Figure 14:
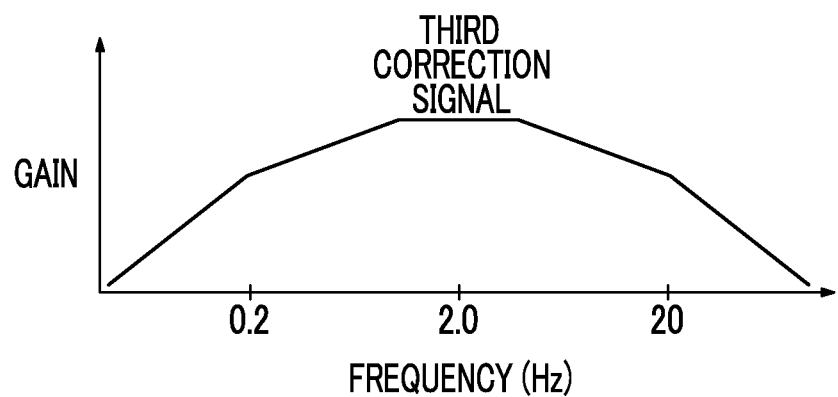
FIG. 14 is a graph showing a frequency band of a third correction signal.

As shown in FIG. 14, the third correction signal includes a frequency band of an ultra low frequency (0.2 Hz) to a high frequency (20 Hz). While an angular velocity signal immediately after output from the X-axis angular velocity sensor 36 has the same frequency band, the third correction signal is amplified such that the signal value of the angular velocity signal of an ultra low frequency to a low frequency becomes the same level as the signal value of the angular velocity signal of a low frequency to a high frequency. Therefore, if the actuator is driven based on the third correction signal, it is possible to appropriately correct shake of the image due to oscillation of an ultra low frequency to a high frequency.

The CPU 115 of this embodiment includes an A/D converter 116 which converts the third correction signal to a digital signal, and a third coefficient multiplication unit 117. A coefficient setting unit 118 sets a third coefficient along with the first coefficient and the second coefficient. As shown in FIG. 15, the third coefficient is set in a table 119 stored in the ROM 68. For example, in "MODE A: LAND HANDHELD MODE", since hand shake is a major cause of shake, the first coefficient is set to "0.2", and the second coefficient is set to "0.7". Furthermore, in order to appropriately correct shake of an ultra low frequency to a high frequency, the third coefficient is set to "0.1". In "MODE B: ON-BOARD HANDHELD MODE", since both hand shake and the rolling of the ship are a cause of shake, the first and second coefficients are set to "0.5". In the mode B, since it is possible to appropriately correct shake of an ultra low frequency to a high frequency by the first and second correction signals added at the same ratio, the third coefficient is set to "0". In "MODE C: ON-BOARD FIXED MODE", since the rolling of the ship is a major cause of shake, the first coefficient is set to "0.7", the second coefficient is set to "0.2", and in order to appropriately correct shake of an ultra low frequency to a high frequency, the third coefficient is set to "0.1".

The addition computation unit 98 creates a composite correction signal by adding the first to third correction signals multiplied by the coefficients. The drive computation unit 99 creates a drive signal of the X-axis actuator 38 based on the composite correction signal and the angular position signal of the X-axis angular position sensor 34 in order to correct shake around the X axis in the image of the observation optical system. The driver 74 drives the X-axis actuator 38 based on the drive signal created by the drive computation unit 99. In this embodiment, shake of the image around the Z axis is corrected by the same configuration and method as shake around the X axis using the angular velocity signal of the Z-axis angular velocity sensor 37, and thus, detailed description will not be repeated.

According to this embodiment, since shake of the image is corrected using the third correction signal, in which the first and second correction signals are added, along with the first and second correction signals, it is possible to appropriately correct shake due to oscillation of a wide frequency band.

In the above-described embodiments, although the angular velocity signal is split into the two frequency bands, the angular velocity signal may be split into three or more frequency bands. If the number of splits increases, it is possible to more appropriately correct shake of the image due to complex oscillation. As an example of shake correction, although hand shake and the rolling of the ship have been illustrated, the invention can be applied to shake correction of an image in various scenes, for example, hand shake and the rolling of an automobile, an electric train, or an airplane. Furthermore, although "MODE A: LAND HANDHELD MODE", "MODE B: ON-BOARD HANDHELD MODE", and "MODE C: ON-BOARD FIXED MODE" have been described as the shake correction modes, the contents of the modes are not limited thereto. In addition, although the binoculars have been illustrated, the invention may be applied to a monocle.

EXPLANATION OF REFERENCES

10: binoculars
11: housing
12R, 12L: objective lens unit
13R, 13L: ocular lens unit
16: power switch
17: operation member
18: mode switch
30: shake correction device
34: X-axis angular position sensor
35: Z-axis angular position sensor
36: X-axis angular velocity sensor
37: Z-axis angular velocity sensor
38: X-axis actuator
39: Z-axis actuator
49: lock mechanism
66: control unit 72, 73: correction signal output unit
78: first correction signal creation unit
79: second correction signal creation unit

What is claimed is:

1. A shake correction device comprising:
a correction optical element which is displaceably disposed between an objective lens fixed to a housing and an ocular lens fixed to the housing;
an actuator which displaces the correction optical element;
a displacement sensor which detects oscillation applied to the housing and outputs a displacement signal;
a correction signal output unit which splits the displacement signal into a plurality of displacement signals according to frequency bands of the displacement signal and amplifies the respective split displacement signals with individual amplification factors to output the respective amplified displacement signals as a plurality of correction signals for the respective frequency bands; and
a control unit which drives the actuator based on a composite correction signal, in which the plurality of correction signals are composed, and corrects shake of an image formed by the objective lens and the ocular lens.

2. The shake correction device according to claim 1,
wherein the displacement sensor is an angular velocity sensor, and
the correction signal output unit amplifies each of the plurality of displacement signals based on signal output characteristics of the angular velocity sensor as the displacement sensor.

3. The shake correction device according to claim 2,
wherein the control unit creates the composite correction signal by multiplying each of the plurality of correction signals by a coefficient set in advance and adding the plurality of correction signals multiplied by the coefficients.

4. The shake correction device according to claim 3,
wherein the coefficients are set corresponding to a plurality of types of correction modes, in which a correction content of shake of the image is specified, and are changed according to the selection of the correction modes.

5. The shake correction device according to claim 3,
wherein the correction signal output unit has
a filter which splits the displacement signal into at least first and second displacement signals according to frequency bands of the displacement signal, and
an amplification unit which amplifies the first and second displacement signals with individual amplification factors and outputs at least first and second correction signals.

6. The shake correction device according to claim 3,
wherein the correction optical element is an erect prism.

7. An observation device comprising:
a housing;
an objective lens and an ocular lens fixed to the housing; and
the shake correction device according to claim 3.

8. The shake correction device according to claim 2,
wherein the correction signal output unit has
a filter which splits the displacement signal into at least first and second displacement signals according to frequency bands of the displacement signal, and
an amplification unit which amplifies the first and second displacement signals with individual amplification factors and outputs at least first and second correction signals.

9. The shake correction device according to claim 2,
wherein the correction optical element is an erect prism.

10. An observation device comprising:
a housing;
an objective lens and an ocular lens fixed to the housing; and
the shake correction device according to claim 2.

11. The shake correction device according to claim 1,
wherein the control unit creates the composite correction signal by multiplying each of the plurality of correction signals by a coefficient set in advance and adding the plurality of correction signals multiplied by the coefficients.

12. The shake correction device according to claim 11,
wherein the coefficients are set corresponding to a plurality of types of correction modes, in which a correction content of shake of the image is specified, and are changed according to the selection of the correction modes.

13. The shake correction device according to claim 12,
wherein the correction signal output unit has
a filter which splits the displacement signal into at least first and second displacement signals according to frequency bands of the displacement signal, and
an amplification unit which amplifies the first and second displacement signals with individual amplification factors and outputs at least first and second correction signals.

14. The shake correction device according to claim 11,
wherein the correction signal output unit has
a filter which splits the displacement signal into at least first and second displacement signals according to frequency bands of the displacement signal, and
an amplification unit which amplifies the first and second displacement signals with individual amplification factors and outputs at least first and second correction signals.

15. The shake correction device according to claim 11,
wherein the correction optical element is an erect prism.

16. An observation device comprising:
a housing;
an objective lens and an ocular lens fixed to the housing; and
the shake correction device according to claim 11.

17. The shake correction device according to claim 1,
wherein the correction signal output unit has
a filter which splits the displacement signal into at least first and second displacement signals according to frequency bands of the displacement signal, and
an amplification unit which amplifies the first and second displacement signals with individual amplification factors and outputs at least first and second correction signals.

18. The shake correction device according to claim 17,
wherein the correction signal output unit has a signal addition unit which outputs a third correction signal obtained by adding the first and second correction signals, and
the control unit drives the actuator based on the composite correction signal in which the first, second, and third correction signals are composed.

19. The shake correction device according to claim 1,
wherein the correction optical element is an erect prism.

20. An observation device comprising:
a housing;
an objective lens and an ocular lens fixed to the housing; and
the shake correction device according to claim 1.

* * * * *